United States Patent
Ho

(10) Patent No.: US 11,714,970 B2
(45) Date of Patent: Aug. 1, 2023

(54) SYSTEMS AND METHODS FOR DETECTING DECEPTION IN COMPUTER-MEDIATED COMMUNICATIONS

(71) Applicant: The Florida State University Research Foundation, Tallahassee, FL (US)

(72) Inventor: Shuyuan Ho, Tallahassee, FL (US)

(73) Assignee: The Florida State University Research Foundation, Tallahassee, FL (US)

(*) Notice: Subject to any disclaimer, the term of this patent is extended or adjusted under 35 U.S.C. 154(b) by 197 days.

(21) Appl. No.: 17/162,468

(22) Filed: Jan. 29, 2021

(65) Prior Publication Data
US 2022/0245359 A1    Aug. 4, 2022

(51) Int. Cl.
*G06F 40/35* (2020.01)
*G06N 20/00* (2019.01)
(Continued)

(52) U.S. Cl.
CPC .......... *G06F 40/35* (2020.01); *G06F 18/2148* (2023.01); *G06N 20/00* (2019.01); *G06V 40/176* (2022.01); *G10L 17/26* (2013.01)

(58) Field of Classification Search
CPC ........ G06F 40/35; G06F 40/284; G06F 40/30; G06F 40/216; G06K 9/6257; G06N 20/00; G06V 40/176; G10L 17/26
See application file for complete search history.

(56) References Cited

U.S. PATENT DOCUMENTS

| 8,346,864 B1* | 1/2013 | Amidon ................ G06Q 10/10 709/224 |
| 2007/0010993 A1* | 1/2007 | Bachenko ............. G06F 40/253 704/9 |

(Continued)

OTHER PUBLICATIONS

E. J. Briscoe, D. S. Appling and H. Hayes, "Cues to Deception in Social Media Communications," 2014 47th Hawaii International Conference on System Sciences, 2014, pp. 1435-1443, doi: 10.1109/HICSS.2014.186. (Year: 2014).*

(Continued)

*Primary Examiner* — Bhavesh M Mehta
*Assistant Examiner* — Philip H Lam
(74) *Attorney, Agent, or Firm* — FisherBroyles LLP; Anthony Dovale; James Pohl

(57) ABSTRACT

Provided are methods and systems for detecting deception in computer-mediated communications that can include (i) parsing digital text to identify processable language-action cues in the digital text, (ii) automatically analyzing, using a computing device and using a machine learning-based classifying algorithm, the processable language-action cues to produce respective probabilities of the digital text including the deceptive content, where the machine learning-based classifying algorithm is trained with training data including (A) training language-action cues from digital data indicating response information known to be deceptive and digital data indicating response information known to be truthful and (B) respective predictor weights associated with the training language-action cues, and (iii) displaying a histogram on a user display device, where the histogram indicates, over a period of time, frequencies of the respective probabilities of the digital text including the deceptive content. Other methods, systems, and computer-readable media are also disclosed.

21 Claims, 7 Drawing Sheets

(51) Int. Cl.
*G10L 17/26* (2013.01)
*G06V 40/16* (2022.01)
*G06F 18/214* (2023.01)

(56) References Cited

U.S. PATENT DOCUMENTS

| | | | | |
|---|---|---|---|---|
| 2012/0254333 A1* | 10/2012 | Chandramouli | ........ | G06F 40/10 709/206 |
| 2016/0014151 A1* | 1/2016 | Prakash | ................ | G06N 7/005 726/22 |
| 2018/0025303 A1* | 1/2018 | Janz | ...................... | G16H 50/20 705/2 |

OTHER PUBLICATIONS

Rubin, V.L. and Conroy, N.J. (2011), Challenges in automated deception detection in computer-mediated communication. Proc. Am . Soc. Info. Sci. Tech., 48: 1-4. https://doi.org/10.1002/meet.2011.14504801098 (Year: 2011).*

Conroy, N.K., Rubin, V.L. and Chen, Y. (2015), Automatic deception detection: Methods for finding fake news. Proc. Assoc. Info. Sci. Tech., 52: 1-4. https://doi.org/10.1002/pra2.2015.145052010082 (Year: 2015).*

Zhou, L., Twitchell, D. P., Qin, T., Burgoon, J. K., & Nunamaker, J. F. (Jan. 2003). An exploratory study into deception detection in text-based computer-mediated communication. In 36th Annual Hawaii International Conference on System Sciences, 2003. Proceedings of the (pp. 10-pp). IEEE. (Year: 2003).*

Rowe, N. C., Custy, E. J., & Duong, B. T. (2007). Defending cyberspace with fake honeypots. J. Comput., 2(2), 25-36. (Year: 2007).*

Rubin, V. L., & Lukoianova, T. (2015). Truth and deception at the rhetorical structure level. Journal of the Association for Information Science and Technology, 66(5), 905-917. (Year: 2015).*

Ho et al., i-Sensor Inference Model for Assessing Trustworthiness in Computer-Mediated Communications, CSCW 2011, Mar. 19-23, 2011, Hangzhou, China, ACM 978-1-4503-0556-3/11/03, 4 pp.

Ho et al., Computer-Mediated Deception: Collective Language-Action Cues as Stigmergic Signals for Computational Intelligence, Proceedings of the 51st Hawaii International Conference on System Sciences, 2018, URI: http://hdl.handle.net/10125/50098, ISBN: 978-0-9981331-1-9, 10 pp.

Ho et al., Context in a bottle: Language-action cues in spontaneous computer-mediated deception, Elsevier, Computers in Human Behavior 91 (2019) 33-41.

Ho et al, Liar, Liar, IM on Fire: Deceptive Language-Action Cues in Spontaneous Online Communication, IEEE, 978-1-4799-9889-0, 2015, 3 pp.

Ho et al., Computer-Mediated Deception: Strategies Revealed by Language-Action Cues in Spontaneous Communication, Journal of Management Information Systems, 33:2, 393-420, DOI: 10.1080/07421222.2016.1205924.

Ho et al.; Real or Spiel? A Decision Tree Approach for Automated Detection of Deceptive Language-Action Cues, 49th Hawaii International Conference on System Sciences, 2016, IEEE, DOI 10.1109/HICSS.2016.462, 10 pp.

Ho et al, Saint or Sinner? Language-action Cues for Modeling Deception Using Support Vector Machines, Springer-Verlag Berlin Heidelberg 2016, 10 pp.

Ho, Shuyuan Mary; Online Polygraph: A Predictive Analytics Model of Trustworthiness Based on Analyzing Communication Patterns; iSensor Analytics: https://isensoranalytics.com/, Sep. 26, 2020; 227 pp.

* cited by examiner

SYSTEMS AND METHODS FOR DETECTING DECEPTION IN COMPUTER-MEDIATED COMMUNICATIONS

BACKGROUND

As use of computer-mediated communications increases, risks of online deception are also growing. Computer-mediated communications provide ways for users to communicate via networked computers, such as via digital text, digital audio, and/or digital video. Examples of computer-mediated communications include email, text messaging, chat rooms, and social media. Some risks associated with using computer-mediated communications include becoming a target of attempts at social engineering, spam, phishing, identity theft, and/or fraud. Despite the risks, using computer-mediated communications provides many productive benefits. Thus, there are needs to protect users from these risks so users can enjoy the benefits of computer mediated communications while protecting on-line identities, safety, and security of users. The present disclosure, therefore, identifies and addresses needs for systems and methods for detecting deceptive content in computer-mediated communications.

SUMMARY

As is described in greater detail herein, the present disclosure describes systems and methods for detecting deceptive content in computer-mediated communications.

In an example, a method for detecting deceptive content in computer-mediated communications can include (i) parsing digital text to identify processable language-action cues in the digital text, (ii) automatically analyzing, using a computing device and using a machine learning-based classifying algorithm, the processable language-action cues to produce respective probabilities of the digital text including the deceptive content, where the machine learning-based classifying algorithm is trained with training data including (A) training language-action cues from digital data indicating response information known to be deceptive and digital data indicating response information known to be truthful and (B) respective predictor weights associated with the training language-action cues, and (iii) displaying a histogram on a first user display device, where the histogram indicates, over a period of time, frequencies of the respective probabilities of the digital text including the deceptive content.

In some examples, the method can further include (i) creating the training data by (A) displaying, on at least one of the first user display device or a second user display device, at least one of questions, statements, or answers, (B) receiving, from a human interface device, digital data describing response information, where the response information is known to be deceptive or truthful, (C) identifying the training language-action cues in the digital data describing the response information, (D) correlating, using logistic regression analysis, the training language-action cues to identify respective statistical significances of the training language-action cues, (E) classifying the training language-action cues to identify respective degrees of deviant behavior of the training language-action cues, and (F) assigning, based on the respective statistical significances and the respective degrees of deviant behavior, the respective predictor weights to each of the training language-action cues, and (ii) storing, as the training data, the training language-action cues and the respective predictor weights.

In some examples, the method can further include displaying, on the at least one of the first user display device or the second user display device, either (i) instructions to respond quickly and in a deceptive manner or (ii) instructions to respond quickly and in a truthful manner. The at least one of the questions, the statements, or the answers can be configured to elicit the response information from a person.

In some examples, the respective statistical significances can include at least one of a minimum probability of deception, a first quadrant probability of deception, a median probability of deception, a mean probability of deception, a third quadrant probability of deception, and/or a maximum probability of deception.

In some examples, the digital text can be at least one of (i) transcript text, (ii) interview text, (iii) questionnaire response text, (iv) converted digital text produced by converting, using a natural language processing technique, digitized audio to the converted digital text, (v) social media text, or (vi) Internet-sourced digital text.

In some examples, the method can further include (i) recording the digital text in a digital storage device, (ii) retrieving the digital text from the digital storage device, and (iii) automatically displaying, on the first user display device, the digital text and the histogram in a synchronized manner.

In some examples, the method can further include (i) combining, to form combined deception data, the respective probabilities of the digital text including the deceptive content with at least one of (A) probabilities of deception that are output from facial expression analysis, (B) probabilities of deception that are output from natural language processing, (C) probabilities of deception that are output from speech tone analysis, (D) probabilities of deception that are output from speech pitch analysis, or (E) probabilities of deception that are output from physiological testing. The histogram can indicate frequencies of the respective probabilities of the combined deception data indicating the deceptive content.

In one embodiment, a system for detecting deceptive content in computer-mediated communications can include a physical (i.e., tangible) processor coupled to a physical memory that includes (i.e., stores) computer-executable instructions that, when executed by the physical processor, cause the physical processor to (i) parse digital text to identify processable language-action cues in the digital text, (ii) automatically analyze, at the system and using a machine learning-based classifying algorithm, the processable language-action cues to produce respective probabilities of the digital text including the deceptive content, where the machine learning-based classifying algorithm is trained with training data including (A) training language-action cues from digital data indicating response information known to be deceptive and digital data indicating response information known to be truthful and (B) respective predictor weights associated with the training language-action cues, and display a histogram on a first user display device, where the histogram indicates, over a period of time, frequencies of the respective probabilities of the digital text including the deceptive content.

In some examples, the computer-executable instructions can further include computer-executable instructions that, when executed by the physical processor, cause the physical processor to (i) create the training data by (A) displaying, on at least one of the first user display device or a second user display device, at least one of questions, statements, or answers, (B) receiving, from a human interface device, digital data describing response information, where the response information is known to be deceptive or truthful, (C) identifying the training language-action cues in the digital data describing the response information, (D) correlating, using logistic regression analysis, the training language-action cues to identify respective statistical significances of the training language-action cues, (E) classifying the training language-action cues to identify respective degrees of deviant behavior of the training language-action cues, and (F) assigning, based on the respective statistical significances and the respective degrees of deviant behavior, the respective predictor weights to each of the training language-action cues, and (ii) store, as the training data, the training language-action cues and the respective predictor weights.

In some examples, the computer-executable instructions can further include computer-executable instructions that, when executed by the physical processor, cause the physical processor to display, on the at least one of the first user display device or the second user display device, either (i) instructions to respond quickly and in a deceptive manner or (ii) instructions to respond quickly and in a truthful manner. The at least one of the questions, the statements, or the answers can be configured to elicit the response information from a person.

In some examples, the respective statistical significances can include at least one of a minimum probability of deception, a first quadrant probability of deception, a median probability of deception, a mean probability of deception, a third quadrant probability of deception, or a maximum probability of deception.

In some examples, the digital text can be at least one of (i) transcript text, (ii) interview text, (iii) questionnaire response text, (iv) converted digital text produced by converting, using a natural language processing technique, digitized audio to the converted digital text, (v) social media text, or (vi) Internet-sourced digital text.

In some examples, the computer-executable instructions can further include computer-executable instructions that, when executed by the physical processor, cause the physical processor to (i) record the digital text in a digital storage device, (ii) retrieve the digital text from the digital storage device, and (iii) automatically display, on the first user display device, the digital text and the histogram in a synchronized manner.

In some examples, the computer-executable instructions can further include computer-executable instructions that, when executed by the physical processor, cause the physical processor to form combined deception data by combining the respective probabilities of the digital text including the deceptive content with at least one of (i) probabilities of deception that are output from facial expression analysis, (ii) probabilities of deception that are output from natural language processing, (iii) probabilities of deception that are output from speech tone analysis, or (iv) probabilities of deception that are output from speech pitch analysis, where the histogram indicates frequencies of the respective probabilities of the combined deception data indicating the deceptive content.

In some examples, the above-described method can be encoded as computer-readable instructions on a non-transitory computer-readable medium. For example, a computer-readable medium can include one or more computer-executable instructions that, when executed by at least one processor of a computing device, can cause the computing device to (i) parse digital text to identify processable language-action cues in the digital text, (ii) automatically analyze, at the computing device and using a machine learning-based classifying algorithm, the processable language-action cues to produce respective probabilities of the digital text including deceptive content, where the machine learning-based classifying algorithm is trained with training data including (A) training language-action cues from digital data indicating response information known to be deceptive and digital data indicating response information known to be truthful and (B) respective predictor weights associated with the training language-action cues, and (iii) display a histogram on a first user display device, where the histogram indicates, over a period of time, frequencies of the respective probabilities of the digital text including the deceptive content.

In some examples, the computer-executable instructions can further include computer-executable instructions that, when executed by the at least one processor, cause the computing device to (i) create the training data by (A) displaying, on at least one of the first user display device or a second user display device, at least one of questions, statements, or answers, (B) receiving, from a human interface device, digital data describing response information, where the response information is known to be deceptive or truthful, (C) identifying the training language-action cues in the digital data describing the response information, (D) correlating, using logistic regression analysis, the training language-action cues to identify respective statistical significances of the training language-action cues, (E) classifying the training language-action cues to identify respective degrees of deviant behavior of the training language-action cues, and (F) assigning, based on the respective statistical significances and the respective degrees of deviant behavior, the respective predictor weights to each of the training language-action cues, and (ii) store, as the training data, the training language-action cues and the respective predictor weights.

In some examples, the computer-executable instructions can further include computer-executable instructions that, when executed by the at least one processor, cause the computing device to display, on the at least one of the first user display device or the second user display device, either (i) instructions to respond quickly and in a deceptive manner or (ii) instructions to respond quickly and in a truthful manner. In some examples, the at least one of the questions, the statements, or the answers can be configured to elicit the response information from a person.

In some examples, the respective statistical significances can include at least one of a minimum probability of deception, a first quadrant probability of deception, a median probability of deception, a mean probability of deception, a third quadrant probability of deception, or a maximum probability of deception.

In some examples, the digital text can be at least one of (i) transcript text, (ii) interview text, (iii) questionnaire response text, (iv) converted digital text produced by converting, using a natural language processing technique, digitized audio to the converted digital text, (v) social media text, or (vi) Internet-sourced digital text.

In some examples, the computer-executable instructions can further include computer-executable instructions that, when executed by the at least one processor, cause the computing device to (i) record the digital text in a digital storage device, (ii) retrieve the digital text from the digital storage device, (iii) automatically display, on the first user display device, the digital text and the histogram in a synchronized manner.

In some examples, the computer-executable instructions can further include computer-executable instructions that, when executed by the at least one processor, cause the computing device to form combined deception data by combining the respective probabilities of the digital text including the deceptive content with at least one of (i) probabilities of deception that are output from facial expression analysis, (ii) probabilities of deception that are output from natural language processing, (iii) probabilities of deception that are output from speech tone analysis, (iv) probabilities of deception that are output from speech pitch analysis, or (v) probabilities of deception that are output from physiological testing, where the histogram indicates frequencies of the respective probabilities of the combined deception data indicating the deceptive content.

Features from any of the embodiments described herein can be used in combination with one another in accordance with the general principles described herein. These and other embodiments, features, and advantages are more fully understood upon reading this description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
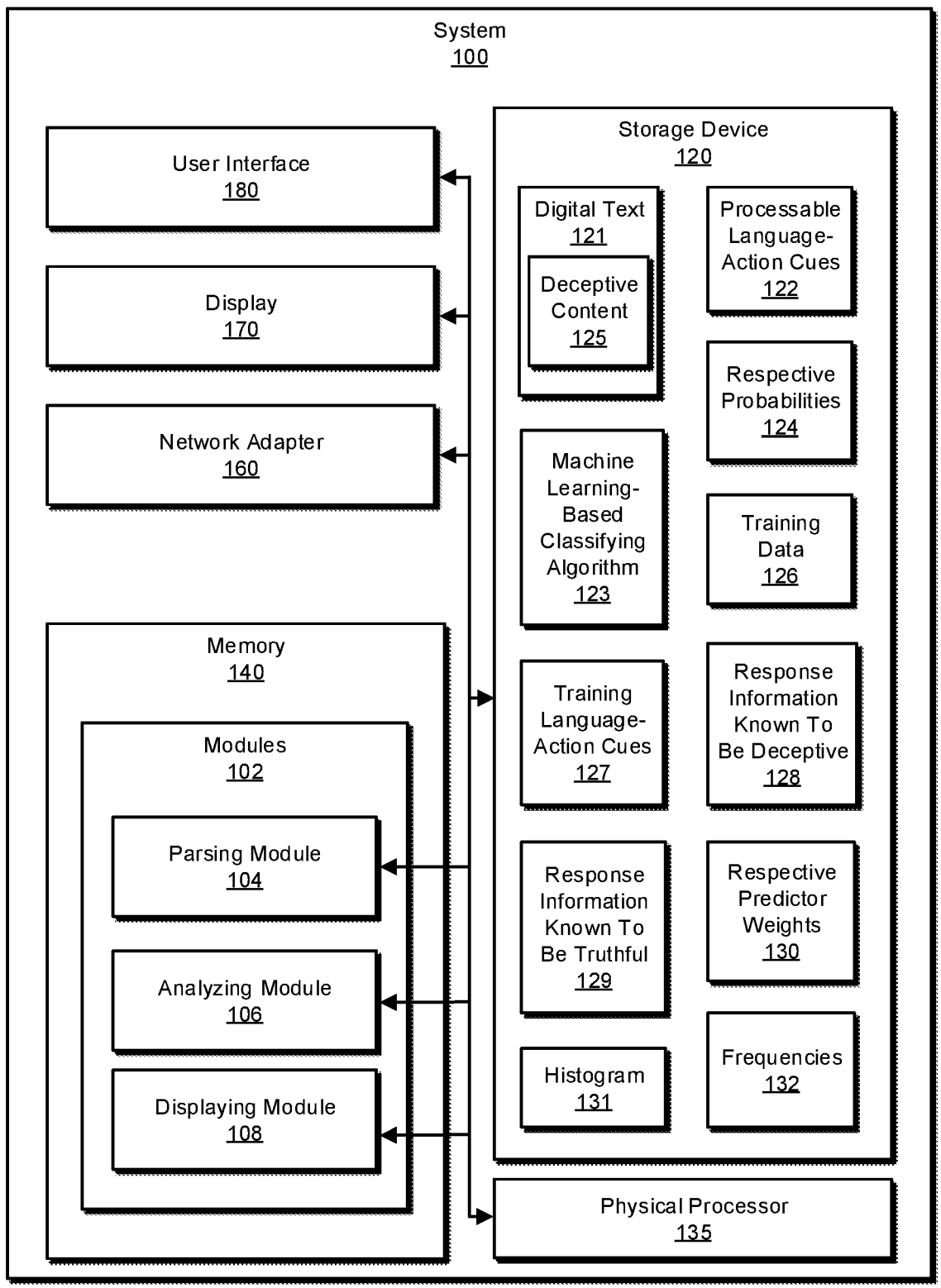
FIG. 1 is a block diagram of an example system for detecting deceptive content in computer-mediated communications.

Throughout the drawings, identical reference characters and descriptions indicate similar, but not necessarily identical, elements. While the example embodiments described herein are susceptible to various modifications and alternative forms, specific embodiments have been shown by way of example in the drawings and are described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for detecting deceptive content in computer-mediated communications.

Provided are predictive analytics approaches that can analyze communication patterns in digital text (e.g., provided by online actors) and can identify a level of trustworthiness of the content of the digital text based on dynamic, interactive, and/or interpersonal communication patterns in digital text. In non-limiting examples, the provided techniques can be used as an "online polygraph" that can analyze online digital communications (e.g., where face-to-face interaction may not be present and/or physiological datapoints may be absent) to identify and/or address the problems of computer-mediated deception. In some examples, the provided systems and methods can analyze textual and linguistic features as well as time lags (i.e., derived from timestamps) present in digital text to identify deceptive content in digital text.

As will be explained in greater detail herein, systems and methods described herein may automatically detect presences, probabilities, and/or degrees of deception (i.e., extents of deception) of digital text by using a machine learning-based classifying algorithm to analyze processable language-action cues. In some examples, the machine learning-based classifying algorithm can be trained with training language-action cues from (i) digital data indicating response information known to be deceptive and (ii) digital data indicating response information known to be truthful, as well as respective predictor weights associated with the training language-action cues. In some examples, the machine learning models may process inputs including processable language-action cues identifying potentially deceptive content in the digital text. The systems and methods described herein may implement explainable machine learning techniques to provide insight into reasons for which digital text is characterized in the manner in which the machine learning model characterizes it. The analyzing can produce respective probabilities of the digital text including the deceptive content.

In embodiments, the systems and methods described herein may display, on user display devices, the indications of extents of deceptive content in the digital text to provide users with near real time deception indications that can identify a level of trustworthiness of the content of the digital text. For example, histograms can be provided that provide information identifying degrees and/or probabilities of deceptive content in the digital text. The histograms can be produced from outputs of the machine learning-based classifying algorithm.

By doing so, the systems and methods described herein may advantageously improve functioning of computing devices (e.g., user devices), improve cybersecurity protection provided to computing devices, and/or provide targeted protection against deceptive communications, and thus improve fields of cybersecurity protection in general, by providing a method for automatically increasing cybersecurity protection of computing devices. Examples of the provided techniques may advantageously improve a state of security of computing devices, such as mobile phones, computers, tablet computers, and/or mobile computers, potentially resulting in significant time and/or monetary savings. Further, systems and methods described herein may beneficially identify, reduce an impact of, and/or eliminate an impact of deceptive content in digital text. In some examples, the provided systems and methods may advantageously improve functioning of protected computing devices by providing increased cybersecurity protection to the protected computing devices. Further, the provided techniques may advantageously detect difficult-to-detect deceptive digital communications. In some examples, the provided techniques may better-inform users of user devices by alerting the users of potential risks of specific digital communications. Thus, disclosed systems and methods may advantageously provide protection for common targets of deceptive digital communications.

Figure 2:
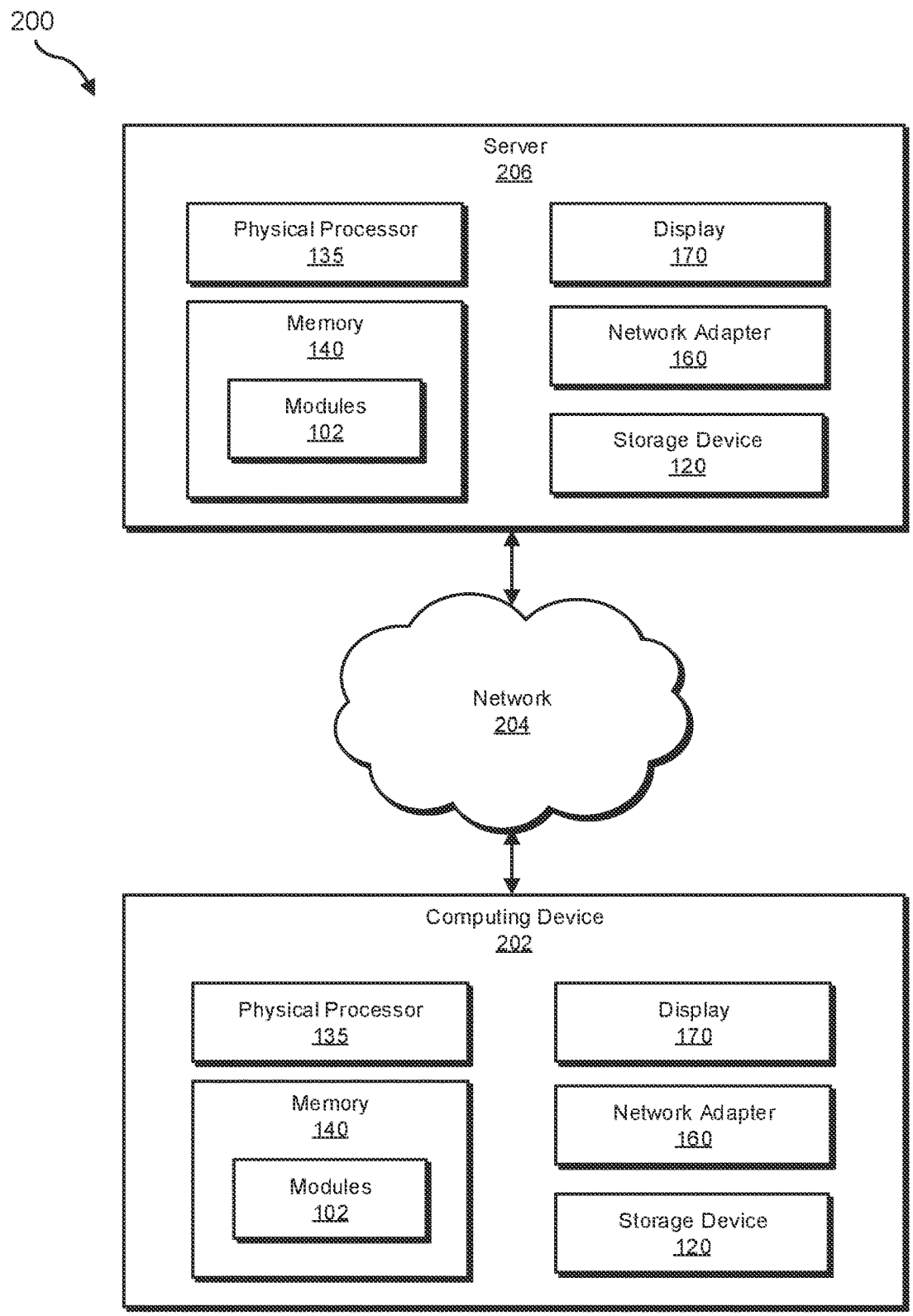
FIG. 2 is a block diagram of an additional example system for detecting deceptive content in computer-mediated communications.

The following will provide, with reference to FIGS. 1-2, detailed descriptions of example systems for detecting deceptive content in computer-mediated communications. Detailed descriptions of corresponding computer-implemented methods will also be provided in connection with FIGS. 3-5. In addition, detailed descriptions of an example computing system and network architecture capable of implementing one or more of the embodiments described herein are provided in connection with FIGS. 6 and 7, respectively.

FIG. 1 is a block diagram of an example system 100 for detecting deceptive content in computer-mediated communications. As illustrated in this figure, example system 100 can include one or more modules 102 for performing one or more tasks. As is explained in greater detail herein, modules 102 can include a parsing module 104, an analyzing module 106, and a displaying module 108. Although illustrated as separate elements, one or more of modules 102 in FIG. 1 can represent portions of a single module or application.

In certain embodiments, one or more of modules 102 in FIG. 1 can represent one or more software applications or programs that, when executed by a computing device, can cause the computing device to perform one or more tasks. For example, and as is described in greater detail herein, one or more of modules 102 can represent modules stored and configured to run on one or more computing devices, such as the devices illustrated in FIG. 2 (e.g., computing device 202 and/or server 206). One or more of modules 102 in FIG. 1 can also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In some examples, storage device 120 may store, load, and/or maintain information (e.g., digital data) indicating one or more of digital text 121, processible language-action cues 122, a machine learning-based classifying algorithm 123, respective probabilities 124 of digital text 121 including deceptive content 125, deceptive content 125, training data 126, training language-action cues 127, response information known to be deceptive 128, response information known to be truthful 129, respective predictor weights 130, a histogram 131, and/or frequencies 132 of respective probabilities 124 of digital text 121 including deceptive content 125.

In a non-limiting example, digital text 121 can include digital data describing response information known to be deceptive 128, digital data describing response information known to be truthful 129, or a combination thereof.

Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, an attached storage device, variations or combinations of one or more of the same, and/or any other suitable storage memory.

As illustrated in FIG. 1, example system 100 can also include one or more physical processors, such as physical processor 135. Physical processor 135 generally represents any type or form of hardware-implemented processing unit capable of interpreting and/or executing computer-readable instructions. In an example, physical processor 135 can access and/or modify one or more of modules 102 stored in memory 140. Additionally or alternatively, physical processor 135 can execute one or more of modules 102 to facilitate detecting deceptive content in computer-mediated communications. Examples of physical processor 135 include, without limitation, microprocessors, microcontrollers, Central Processing Units (CPUs), Field-Programmable Gate Arrays (FPGAs) that implement softcore processors, programmable logic devices (PLDs), Application-Specific Integrated Circuits (ASICs), portions of one or more of the same, variations or combinations of one or more of the same, and/or any other suitable physical processor.

In an example, physical processor 135 can be a hardware-implemented processing unit configured to control at least a portion of operation of system 100. Physical processor 135 can perform logical and arithmetic operations based on processor-executable instructions stored within memory 140. Physical processor 135 can be configured to execute instructions which cause physical processor 135 to initiate at least a part of a method described hereby. In an example, physical processor 135 can interpret instructions stored in memory 140 to initiate at least a part of a method described hereby. In an example, physical processor 135 can execute instructions stored in the memory 140 to initiate at least a part of a method described hereby. The instructions, when executed by physical processor 135, can transform physical processor 135 into a special-purpose processor (i.e., a limited-purpose processor that is not a generic processor) that causes physical processor 135 to perform at least a part of a function described hereby. In an example, a combination of two or more related method steps disclosed hereby forms a sufficient algorithm. In an example, a sufficient algorithm constitutes special programming. In an example, special programming constitutes any software which can cause a computer (e.g., a special-purpose computer) to be configured to perform one or more functions, features, steps algorithms, blocks, or a combination thereof, as disclosed hereby. Physical processor 135 may also be referred to as a central processing unit (CPU), a special-purpose processor (e.g., a non-generic processor), or both.

As illustrated in FIG. 1, example system 100 can also include one or more memory devices, such as memory 140. Memory 140 generally represents any type or form of volatile or non-volatile storage device or medium capable of storing data and/or computer-readable instructions. In an example, memory 140 can store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory. Memory 140 can include a non-transitory machine-readable medium configured to store software. A non-transitory (i.e., a non-transient) machine-readable medium specifically excludes a transitory propagating signal. Software can mean computer-readable instructions, whether referred to as software, firmware, middleware, microcode, hardware description language, the like, or a combination thereof. Processor-readable instructions can include code (e.g., in source code format, in binary code format, executable code format, or in any other suitable code format).

As illustrated in FIG. 1, example system 100 may also include one or more network adapters, such as network adapter 160, to couple system 100 to a digital data communication network. In some examples, network adapter 160 can be a physical network adapter connected to a physical network (e.g., network 204 in FIG. 2). In some examples, network adapter 160 may use different types of hardware interface technologies.

As illustrated in FIG. 1, example system 100 may also include one or more display devices, such as display 170. Display 170 generally represents any type or form of device capable of visually displaying information (e.g., to a user). In some examples, display 170 may present a graphical user interface. In non-limiting examples, the graphical user interface may depict information described hereby, such as histogram 131. In non-limiting examples, display 170 may present at least a portion of information indicating one or more of digital text 121, processible language-action cues 122, machine learning-based classifying algorithm 123, respective probabilities 124 of digital text 121 including deceptive content 125, deceptive content 125, training data 126, training language-action cues 127, response information known to be deceptive 128, response information known to be truthful 129, respective predictor weights 130, histogram 131, and/or frequencies 132 of respective probabilities 124 of digital text 121 including deceptive content 125.

As illustrated in FIG. 1, example system 100 may also include one or more user interface devices, such as user interface 180. User Interface 180 generally represents any type or form of device capable of enabling a user to operate and/or control system 100. User Interface 180 can include user devices such as a switch, a keypad (e.g., to input at least a portion of digital text 121), a touch screen, a microphone (e.g., to input speech converted to digital text 121), a speaker, an audio reproduction device, a jack for coupling the computing device to an audio reproduction device, the like, or a combination thereof. User Interface 180 can optionally include a user interface controller. In an example, user Interface 180 can include a component configured to convey information to a user of system 100, a component configured to receive information from the user of the system 100, or both.

Example system 100 in FIG. 1 can be implemented in a variety of ways. For example, all or a portion of example system 100 can represent portions of example system 200 in FIG. 2. As shown in FIG. 2, system 200 can include a computing device 202 in communication with a server 206 via a network 204. In an example, all or a portion of the functionality of modules 102 can be performed by computing device 202, server 206, and/or any other suitable computing system. As is described in greater detail herein, one or more of modules 102 from FIG. 1 can, when executed by at least one processor of computing device 202 and/or server 206, enable computing device 202 and/or server 206 to detect deceptive content in digital text. For example, and as is described in greater detail herein, one or more of modules 102 can cause computing device 202 and/or server 206 to (i) parse digital text 121 to identify processable language-action cues 122 in digital text 121, (ii) analyze (e.g., automatically), at computing device 202 and/or server 206 and using machine learning-based classifying algorithm 123, processable language-action cues 122 to produce respective probabilities 124 of digital text 121 including deceptive content 125, where machine learning-based classifying algorithm 123 is trained with training data 126 including (A) training language-action cues 127 from digital data indicating response information known to be deceptive 128 and digital data indicating response information known to be truthful 129 and (B) respective predictor weights 130 associated with training language-action cues 127, and (iii) display histogram 131 on display device 170, where histogram 131 indicates, over a period of time, frequencies 132 of respective probabilities 124 of digital text 121 including deceptive content 125.

Computing device 202 generally represents any type or form of computing device capable of reading computer-executable instructions. In some examples, computing device 202 may represent a computer running deception detecting software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device. In a non-limiting example, at least a portion of computing device 202 can include at least a portion of system 100.

Network 204 generally represents any medium or architecture capable of facilitating communication or data transfer. In an example, network 204 can facilitate communication between computing device 202 and server 206. In this example, network 204 can facilitate communication or data transfer using fiber optic connections, wireless connections, and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that is capable of reading computer-executable instructions. In some examples, server 206 may represent a computer running deception detecting software. Additional examples of server 206 include, without limitation, security servers, application servers, web servers, storage servers, and/or database servers configured to run certain software applications and/or provide various polygraph, security, web, storage, computing, and/or database services. Although illustrated as a single entity in FIG. 2, server 206 can include and/or represent a plurality of servers that work and/or operate in conjunction with one another. In a non-limiting example, at least a portion of server 206 can include at least a portion of system 100.

Figure 3:
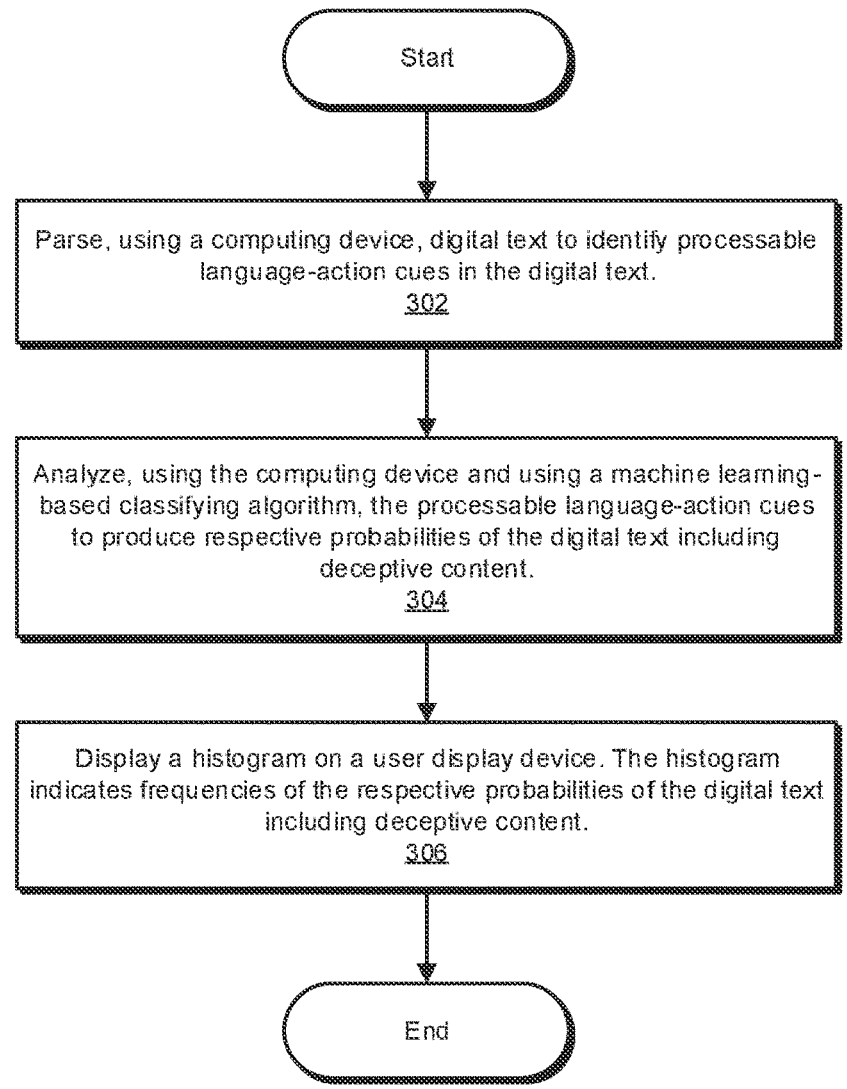
FIG. 3 is a flow diagram of an example method for detecting deceptive content in computer-mediated communications.

FIG. 3 is a flow diagram of an example computer-implemented method 300 for detecting deceptive content in computer-mediated communications. The steps shown in FIG. 3 can be performed by any suitable computer-executable code and/or computing system, including system 100 in FIG. 1, system 200 in FIG. 2, and/or variations or combinations of one or more of the same. In an example, each of the steps shown in FIG. 3 can represent an algorithm whose structure includes and/or is represented by multiple sub-steps, examples of which are provided in greater detail herein.

As illustrated in FIG. 3, at step 302 one or more of the systems described herein can parse digital text to identify at least one processable language-action cue in the digital text. The systems described herein may perform step 302 in a variety of ways. For example, parsing module 104 can, as part of system 100, computing device 202, and/or server 206 in FIG. 2, parse digital text 121 to identify processable language-action cues 122 in digital text 121.

In some examples, one or more of the systems described herein can receive the digital text from a network. For example, system 100, computing device 202, and/or server 206 can receive digital text 121 from network 204 via network adapter 160. In some examples, one or more of the systems described herein can receive the digital text from a program being executed by a physical processor (e.g., physical processor 135) that is a component part of system 100, computing device 202, and/or server 206.

In some examples, a program (e.g., an application) being executed by a physical processor (e.g., physical processor 135) that is a component part of system 100, computing device 202, and/or server 206 can perform at least a portion of a step for detecting deceptive content as described herein. Examples of the program include, and are not limited to, a text messaging program, a web browser, a word processing program, a social media program, a video display program, an audio player, a video conferencing program, a videotelephony program, an online chat program, an Internet conferencing program, a media sharing program, a communication program, or a combination thereof.

In some embodiments, the digital text can be transcript text. For example, digital text 121 can be transcript text. In an example, the digital text can be digital data describing at least a portion of a textual record of a conversation. In some examples, the digital text can be digital data describing at least a portion of a textual record of a court proceeding, a hearing, an audio recording, a meeting, a phone call, a voicemail, recorded speech, a video, a lecture, or a combination thereof.

In some embodiments, the digital text can be interview text. For example, digital text 121 can be interview text. In some examples, the digital text can be digital data describing at least a portion of a textual record of an employment interview, an interview performed by a law enforcement representative, an interview performed by an immigration official, an interview performed by a government official, an interview performed by a school official, an interview performed by a medical professional, or a combination thereof.

In some embodiments, the digital text can be questionnaire response text. For example, digital text 121 can be questionnaire response text. In some examples, the digital text can be digital data describing at least a portion of a textual record of a response to a survey.

In some embodiments, the digital text can be converted digital text produced by converting, using a natural language processing technique, digitized audio to the converted digital text. For example, digital text 121 can be converted digital text produced by converting, using a natural language processing technique, digitized audio to digital text 121. The digitized audio can be recorded audio that is stored in a physical storage device (e.g., memory 140), for a period of time, subsequently retrieved, and converted to the digital text. In some examples, the digitized audio can be converted substantially in real-time to the digital text.

In some embodiments, the digital text can be social media text. For example, digital text 121 can be social media text. In some examples, at least a portion of the digital text can be sent and/or received by a user of system 100, computing device 202, and/or server 206. In some embodiments, the digital text can be received from a social media program being executed by a physical processor (e.g., physical processor 135) that is a component part of system 100, computing device 202, and/or server 206. In some examples, social media text can be produced by celebrities, politicians, dating prospects, prospective business partners, and/or the like.

In some embodiments, the digital text can be Internet-sourced digital text. For example, digital text 121 can be Internet-sourced digital text. In an example, system 100, computing device 202, and/or server 206 can receive digital text 121 from the Internet via network adapter 160.

Figure 6:
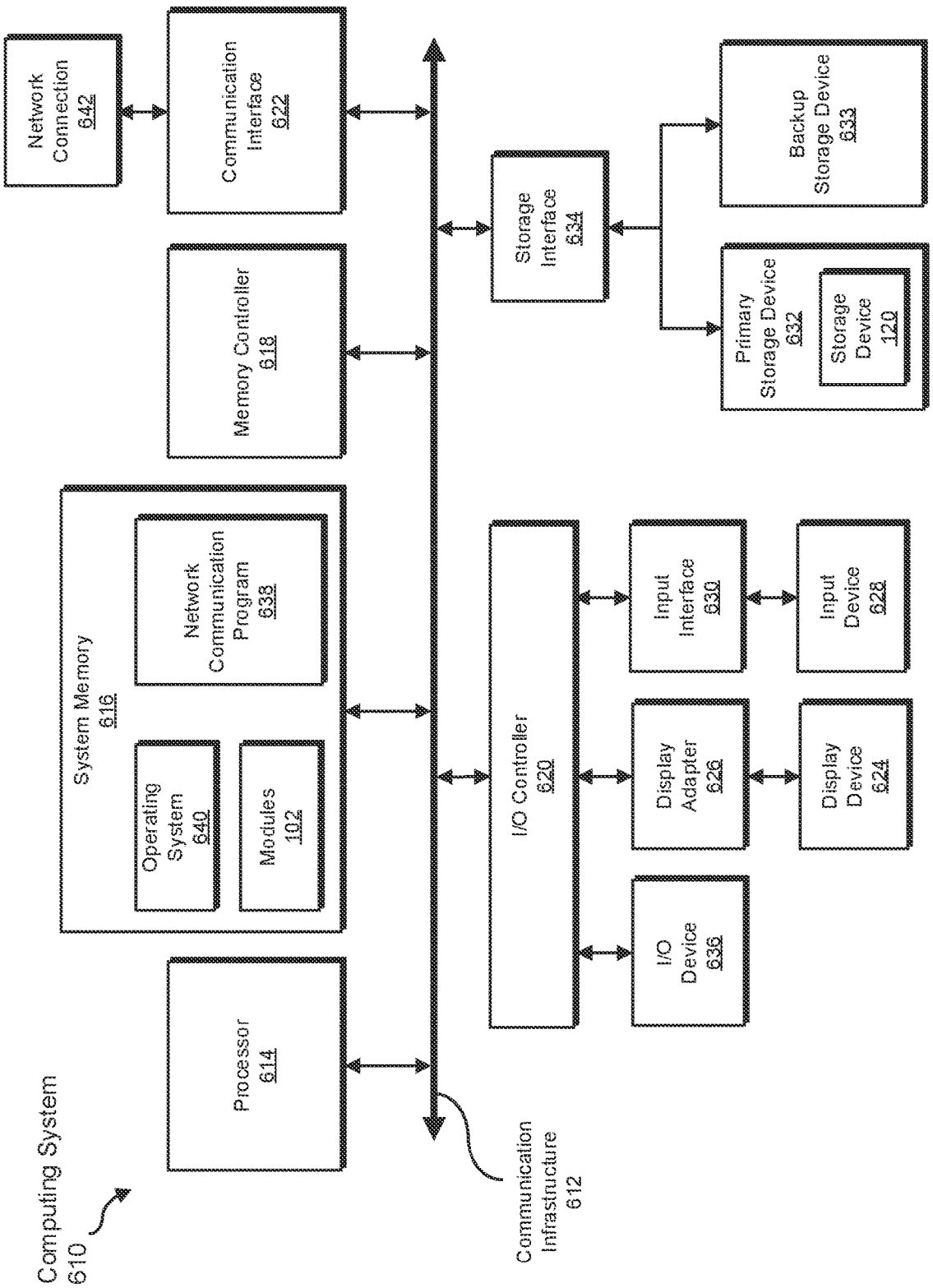
FIG. 6 is a block diagram of an example computing system capable of implementing one or more of the embodiments described and/or illustrated herein.

In some embodiments, the digital text can be recorded in a digital storage device, such as memory 140, primary storage device 632 in FIG. 6, backup storage device 633 in FIG. 6, intelligent storage array 795, or a combination thereof.

In some embodiments, the digital text can be retrieved from a digital storage device, such as memory 140, primary storage device 632 in FIG. 6, backup storage device 633 in FIG. 6, intelligent storage array 795, or a combination thereof.

The term "processable language-action cue," as used herein, generally refers to styles of language, phrases, patterns of words, or acts in digital text that are indirect signals to a reader of the digital text and can be analyzed to produce respective probabilities of the digital text including deceptive content. In non-limiting examples, processable language-action cues may include specific words such as "swear," "feel," "money," "home," "assent," and/or combinations of these words that form specific phrases. In non-limiting examples, processable language-action cues may include specific punctuation such as commas, periods, ellipses, semicolons, question marks, exclamation points, the like, and/or combinations of specific punctuation with words that form specific phrases including punctuation.

As illustrated in FIG. 3, at step 304 one or more of the systems described herein can analyze the processable language-action cues to produce respective probabilities of the digital text including deceptive content. A computing device can perform (e.g., automatically) the analyzing. The computing device can be configured to implement a machine learning-based classifying algorithm, trained as described herein, to perform the analyzing. The systems described herein may perform step 304 in a variety of ways. For example, analyzing module 106 can, as part of system 100, computing device 202, and/or server 206, analyze using machine learning-based classifying algorithm 123, processable language-action cues 122 to produce respective probabilities 124 of digital text 121 including deceptive content 125.

In some examples, the machine learning-based classifying algorithm can be trained with training data including (i) training language-action cues from (A) digital data indicating response information known to be deceptive and (B) digital data indicating response information known to be truthful; and (ii) respective predictor weights associated with the training language-action cues. For example, machine learning-based classifying algorithm 123 can be trained with training data 126. Training data 126 can include training language-action cues 127 from (i) digital data indicating response information known to be deceptive 128 and (ii) digital data indicating response information known to be truthful 129. In an embodiment, Training data 126 can include respective predictor weights 130 associated with training language-action cues 127.

In some embodiments, training data can be created by recording spontaneous human responses of at least two groups of people to questions, statements, and/or answers. The at least one of the questions, the statements, or the answers can be configured to elicit the response information from a person. The system 100, computing device 202, and/or server 206 can automatically present questions, statements, and/or answers to the groups of people and digitally record the responses of the groups of people. In some examples, a user display can display instructions to respond in a deceptive manner. In some examples, a user display can display instructions to respond in a truthful manner. The instructions can instruct the at least two groups of people to respond quickly.

In an example, a first group of people is instructed to respond to the questions, statements, and/or answers in a deceptive manner and a second group of people is instructed to respond to the same questions, statements, and/or answers in a truthful manner. The responses can be digital data describing digital text of the responses and can be digitally recorded (i.e., stored) by a tangible storage device. In some examples, the responses can be digital data describing audio responses, can be converted to digital data describing digital text of the responses (e.g., using a natural language processing technique), and digital data describing digital text of the responses can be digitally recorded by a tangible storage device.

In some examples, the system 100, computing device 202, and/or server 206 can automatically perform the following actions. The digital data describing digital text of the responses can be retrieved from the tangible storage device. Training language-action cues in the responses can be identified. The training language-action cues can be correlated (e.g., using logistic regression analysis, linear regression models, and/or random forest models) to identify respective statistical significances. The training language-action cues can be classified to identify respective degrees of deviant behavior. Respective predictor weights can be assigned to each of the training language-action cues based on the respective statistical significances and the respective degrees of deviant behavior. The training language-action cues and the respective predictor weights can then be stored as training data in a tangible storage device. The training data can also be retrieved from the tangible storage device for training a machine learning-based classifying algorithm. The training data can be used to train a machine learning-based classifying algorithm which can be used to detect deceptive content in digital text (e.g., from computer-mediated communications).

In an example, training data 126 can be created by (A) displaying, on user display device 170 and/or another user display device, at least one of questions, statements, or answers, (B) at least one of (i) retrieving, from a tangible storage device (e.g., storage device 120), digital data describing response information known to be deceptive 128 and/or response information known to be truthful 129 or (ii) receiving (e.g., from a human interface device) digital data describing response information known to be deceptive 128 and/or response information known to be truthful 129, (C) identifying training language-action cues 127 in the digital data describing response information known to be deceptive 128 and/or response information known to be truthful 129, (D) correlating, using logistic regression analysis, training language-action cues 127 to identify respective statistical significances of training language-action cues 127, (E) classifying training language-action cues 127 to identify respective degrees of deviant behavior of training language-action cues 127, and (F) assigning, based on the respective statistical significances and the respective degrees of deviant behavior, respective predictor weights 130 to each of training language-action cues 127.

Training language-action cues 127 and respective predictor weights 130 can be stored as training data 126. The system 100, computing device 202, and/or server 206 can automatically train machine learning-based classifying algorithm 123 with training data 126.

In some examples, the respective statistical significances can include at least one of a minimum probability of deception, a first quadrant probability of deception, a median probability of deception, a mean probability of deception, a third quadrant probability of deception, and/or a maximum probability of deception.

The term "training language-action cue," as used herein, generally refers to styles of language, phrases, patterns of words, or acts described by digital text that are indirect signals to a reader of the digital text and can be used to form training data 126. In a non-limiting example, the term "training language-action cue" can refer to styles of language, phrases, patterns of words, or acts described by digital text 121.

As illustrated in FIG. 3, at step 306 one or more of the systems described herein can display a histogram on a user display device. The histogram can indicate (e.g., over a period of time) frequencies of the respective probabilities of the digital text including the deceptive content. The systems described herein may perform step 306 in a variety of ways. For example, displaying module 108 can, as part of system 100, computing device 202, and/or server 206, display histogram 131 on display 170.

In some circumstances, it can be beneficial to contemporaneously display both the digital text and the histogram for ease of use. Contemporaneously displaying both the digital text and the histogram can beneficially keep the histogram from being displayed in a delayed manner relative to displaying the respective digital text from which the information displayed by the histogram was generated. In some embodiments, the digital text can be retrieved from a digital storage device, such as a memory, a primary storage device, a backup storage device, an intelligent storage array, or a combination thereof. The computer-implemented method 300 for detecting deceptive content in computer-mediated communications can also include automatically displaying (e.g., on a user display device) the digital text and the histogram in a substantially synchronized manner. A user display device can display the histogram at least substantially contemporaneously with the digital text from which the information displayed by the histogram was generated. For example, digital text 121 can be stored and subsequently retrieved from a digital storage device, such as memory 140, primary storage device 632 in FIG. 6, backup storage device 633 in FIG. 6, intelligent storage array 795, or a combination thereof. The storage can be temporary (e.g., at least long enough to substantially equate to delays caused by performing analyzing steps described herein to produce histogram 131) or longer-term. Once retrieved, digital text 121 can be displayed in a substantially synchronized manner along with histogram 131.

The computer-implemented method 300 for detecting deceptive content in computer-mediated communications can also include combining the respective probabilities of the digital text including the deceptive content with other probabilities of deception resulting from applying additional deception-detecting techniques to a communication from which the digital text is produced. The combining of the respective probabilities of the digital text including the deceptive content with other probabilities of deception resulting from applying additional deception-detecting techniques can form combined deception data. In some examples, the respective probabilities of the digital text including the deceptive content can be combined with (A) probabilities of deception that are output from facial expression analysis, (B) probabilities of deception that are output from natural language processing, (C) probabilities of deception that are output from speech tone analysis, (D) probabilities of deception that are output from speech pitch analysis, (E) probabilities of deception that are output from physiological testing, or (F) combinations thereof. In some examples, the histogram can indicate frequencies of the respective probabilities of the combined deception data indicating the deceptive content.

Figure 4:
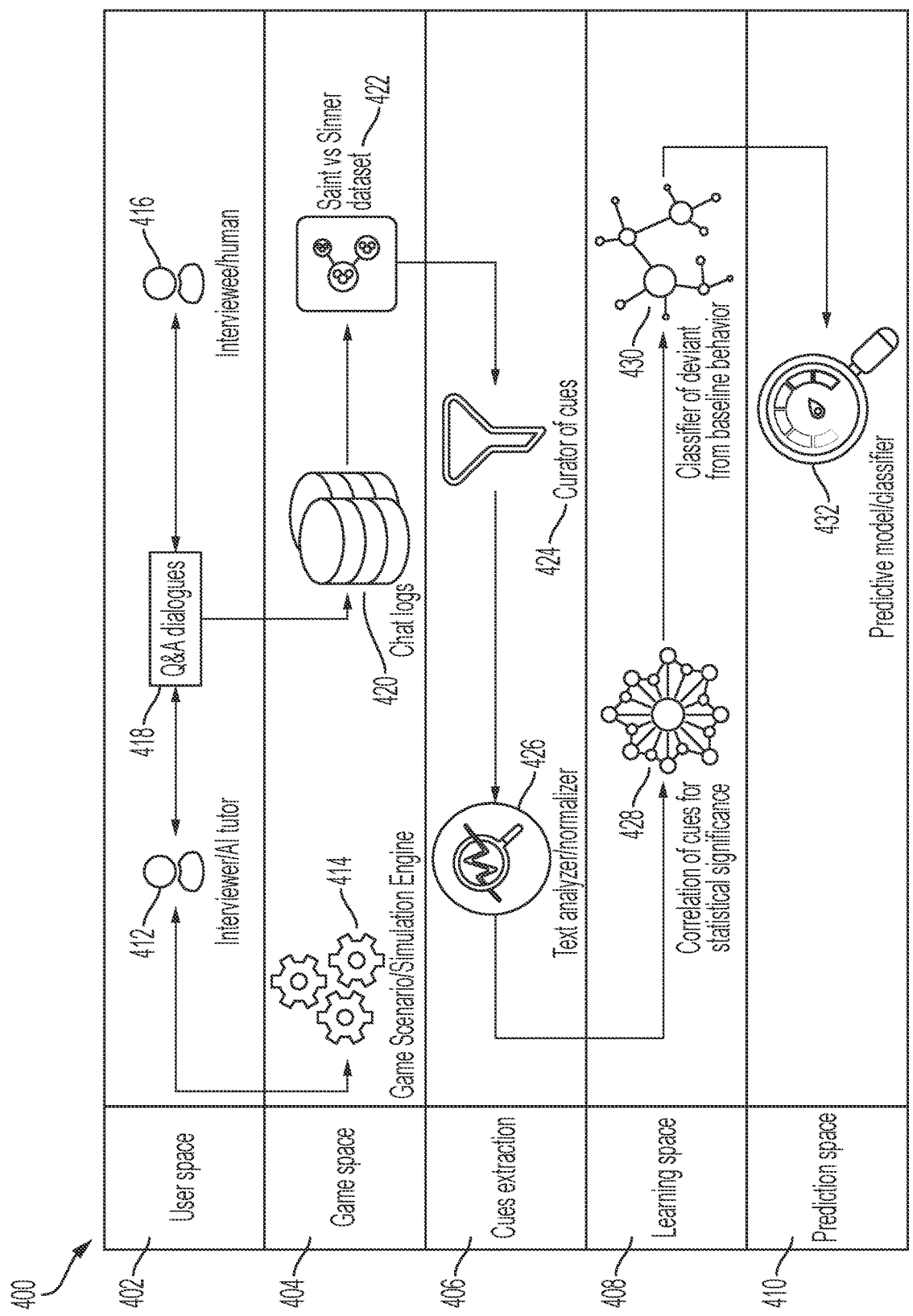
FIG. 4 is a flow diagram of an example method for preparing training data that can be used to train a machine learning model to detect deceptive content in computer-mediated communications.

We now turn to FIG. 4.

FIG. 4 is a flow diagram of a non-limiting example method 400 for preparing a trained machine learning model that is configured to detect deceptive content in digital text. In some non-limiting examples, system 100, computing device 202, and/or server 206 can be configured to perform at least a portion of method 400. In some non-limiting examples, system 100, computing device 202, and/or server 206 can be configured to initiate performing of at least a portion of method 400.

The method 400 can be characterized to include five categories of digital information and/or digital information processing, described as "spaces." There can be a user space 402, a game space 404, a cues extraction space 406, a learning space 408, and/or a prediction space 410.

In an example, an artificial intelligence (AI) tutor 412 program executed by a physical processor of a computing device can use a simulation engine 414 (e.g., providing scenarios) to interact with human participants (e.g., human 416) via human-machine interface devices. The AI tutor 412 can act as an interviewer and present questions to human participants. The human participants are assigned roles as (i) truth-telling humans or (ii) deceptive humans prior to interacting with the AI tutor 412. With rapid human-machine interaction, humans assigned roles as truth-tellers speak truthfully, whereas actors assigned roles as deceivers speak genuine lies.

A simulation engine 414 can include a set of scenarios for AI tutor 412 to communicate and interact with the human participants to enable dialogues 418. Stored responses from the conversations with the humans 420 can be digitally recorded in a database 422 stored by a digital storage device. Thus, AI tutor 412 understands and records the responses. The dataset in database 422 differentiates and classifies truth-telling humans and deceptive humans based on the assigned roles. The dataset in database 422 can be used as a training dataset for training a machine learning-based classifier.

The dataset can be processed and curated 424 to extract training language-action cues. Texts of the responses can be normalized 426 for consistency. The training language-action cues can be correlated 428 to the texts of the responses and classified 430 (e.g., using logistic regression analysis) to identify statistical significances of the training language-action cues. In an example, a dependent variable associated with the training language-action cues can indicate a presence of deception in the training language-action cues. For example, a dependent variable value of zero can indicate a truth-teller, while a dependent variable value of one can indicate a deceiver. In another example, a dependent variable value of one can indicate a truth-teller, while a dependent variable value of zero can indicate a deceiver. Other suitable dependent variables can also be used to indicate and/or differentiate truth-tellers and deceivers.

Parameters and weights can be assigned to predictor variables based on the statistical significances. A machine learning-based classifier 432 (e.g., a prediction model) can be configured by training the machine learning-based classifier with the parameters and weights assigned to the predictor variables. Over time, machine learning-based classifier 432 can be retrained (e.g., updated) as additional humans provide additional responses in response to the AI tutor 412.

Figure 5:
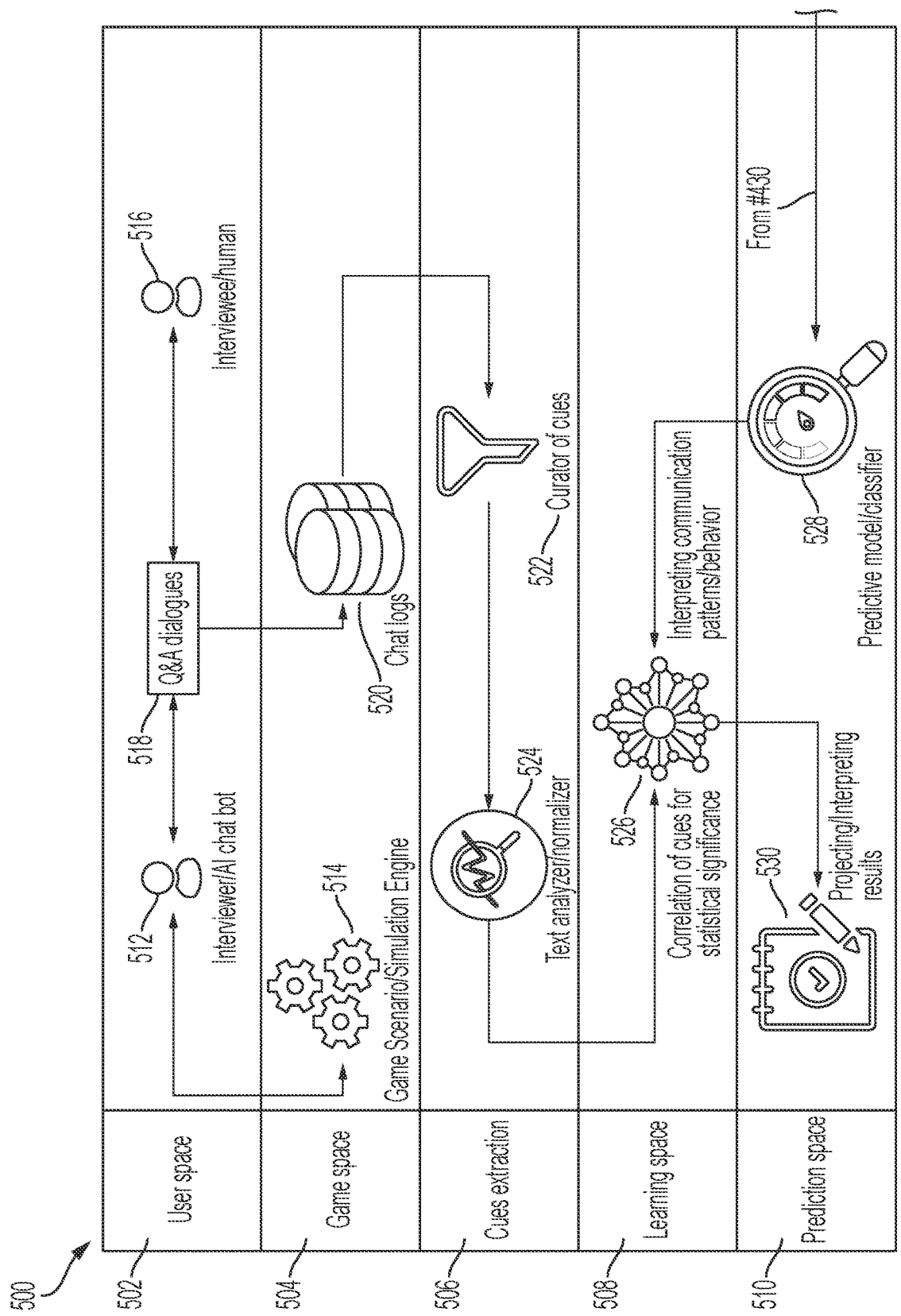
FIG. 5 is a flow diagram of an example method for detecting deceptive content in computer-mediated communications.

We now turn to FIG. 5.

FIG. 5 is a flow diagram of a non-limiting example method 500 for detecting deceptive content in computer-mediated communications. In non-limiting examples, system 100, computing device 202, and/or server 206 can be configured to perform at least a portion of method 500. In non-limiting examples, system 100, computing device 202, and/or server 206 can be configured to initiate performing of at least a portion of method 500.

The method 500 can be characterized to include five categories, described as "spaces." There can be a user space 502, a game space 504, a cues extraction space 506, a learning space 508, and/or a prediction space 510.

An AI chat bot 512 executed by a physical processor of a computing device can present questions (e.g., from a simulation engine 514) to a human participant 516 to enable dialogues 518. AI chat bot 512 can be any suitable robotic chat agent that can have conversations with human participants. In some non-limiting examples, human participant 516 can be an online actor. For example, human participant 516 can interact with AI chat bot 512 in conversations via a computing network about topics such as online banking, e-commerce, an online dating/matching service, employee hiring, and/or background check inquiries (e.g., for employment). Responses from the conversations with human participant 516 can be digitally stored in a database 520 stored by a digital storage device.

The responses can be processed and curated 522 to extract processable language-action cues. Texts of the responses can be normalized 524 for consistency. The processable language-action cues can be correlated 426 to the texts of the responses and classified 430 (e.g., using logistic regression analysis) to identify statistical significances of the training language-action cues.

In an example, a machine learning-based classifier 528 that is trained as described herein can automatically analyze the processable language-action cues to produce respective probabilities of the responses including the deceptive content. In a non-limiting example, the machine learning-based classifier 528 can be machine learning-based classifier 432. When multiple human participants provide responses, the machine learning-based classifier 528 can be used to analyze the conversations stored in the database for each human participant. In an example, the machine learning-based classifier 528 can discern communication patterns in the response in terms of mean, standard deviation, and/or variance of the conversation. This discernment can be output by machine learning-based classifier 528 which indicates interpretation of communication patterns in the response.

In some examples, a histogram can be displayed on a user display device, where the histogram indicates, over a period of time, frequencies of the respective probabilities of the responses including deceptive content. In some examples, the output of machine learning-based classifier 528 and/or the histogram can be sensitive data and protected as such. In some examples, the respective probabilities of the responses including the deceptive content can be displayed on a user display device and/or digitally stored by a digital storage device.

FIG. 6 is a block diagram of an example computing system 610 capable of implementing one or more of the embodiments described and/or illustrated herein. For example, all or a portion of computing system 610 can perform and/or be a means for performing, either alone or in combination with other elements, one or more of the steps described herein (such as one or more of the steps illustrated in FIGS. 3-5). All or a portion of computing system 610 can also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 can include at least one processor 614 and a system memory 616.

Processor 614 generally represents any type or form of physical processing unit (e.g., a hardware-implemented central processing unit) capable of processing data or interpreting and executing instructions. In certain embodiments, processor 614 can receive instructions from a software application or module. These instructions can cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 can include both a volatile memory unit (such as, for example, system memory 616) and a non-volatile storage device (such as, for example, primary storage device 632, as described in detail herein). In an example, one or more of modules 102 from FIG. 1 can be loaded into system memory 616.

In some examples, system memory 616 can store and/or load an operating system 640 for execution by processor 614. In an example, operating system 640 can include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 can also include one or more components or elements in addition to processor 614 and system memory 616. For example, as illustrated in FIG. 6, computing system 610 can include a memory controller 618, an Input/Output (I/O) controller 620, and a communication interface 622, each of which can be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 can control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 can control or facilitate transfer of data between one or more elements of computing system 610, such as processor 614, system memory 616, communication interface 622, display adapter 626, input interface 630, and storage interface 634.

As illustrated in FIG. 6, computing system 610 can also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 can also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 can include additional I/O devices. For example, example computing system 610 can include I/O device 636. In this example, I/O device 636 can include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, a speaker, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 can facilitate communication between computing system 610 and a private or public network including additional computing systems. Examples of communication interface 622 include, without limitation, a wired network interface (such as a network interface card), a wireless network interface (such as a wireless network interface card), a modem, and/or any other suitable interface. In at least one embodiment, communication interface 622 can provide a direct connection to a remote server via a direct link to a network, such as the Internet. Communication interface 622 can also indirectly provide such a connection through, for example, a local area network (such as an Ethernet network), a personal area network, a telephone network, a cable network, a cellular telephone connection, a satellite data connection, and/or any other suitable connection.

In certain embodiments, communication interface 622 can also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, and/or any other suitable host adapter. Communication interface 622 can also allow computing system 610 to engage in distributed or remote computing. For example, communication interface 622 can receive instructions from a remote device or send instructions to a remote device for execution.

In some examples, system memory 616 can store and/or load a network communication program 638 for execution by processor 614. In an example, network communication program 638 can include and/or represent software that enables computing system 610 to establish a network connection 642 with another computing system (not illustrated in FIG. 6) and/or communicate with the other computing system by way of communication interface 622. In this example, network communication program 638 can direct the flow of outgoing traffic that is sent to the other computing system via network connection 642. Additionally or alternatively, network communication program 638 can direct the processing of incoming traffic that is received from the other computing system via network connection 642 in connection with processor 614.

Although not illustrated in this way in FIG. 6, network communication program 638 can alternatively be stored and/or loaded in communication interface 622. For example, network communication program 638 can include and/or represent at least a portion of software and/or firmware that is executed by a processor and/or Application Specific Integrated Circuit (ASIC) incorporated in communication interface 622.

As illustrated in FIG. 6, example computing system 610 can also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 can be a magnetic disk drive (e.g., a hard drive), a solid state drive, a floppy disk drive, a magnetic tape drive, an optical disk drive, a flash drive, and/or the like. Storage interface 634 generally represents any type or form of interface or device configured to transfer digital information (e.g., data, instructions) between storage devices 632 and 633 and other components of computing system 610. In an example, storage device 120 from FIG. 1 can be stored and/or loaded in primary storage device 632.

In certain embodiments, storage devices 632 and 633 can be configured to read from and/or write to a removable storage unit configured to store computer software, data, instructions, and/or other computer-readable information. Examples of suitable removable storage units include, without limitation, a floppy disk, a magnetic tape, an optical disk, a flash memory device, or the like. Storage devices 632 and 633 can also include other similar structures or devices for allowing computer software, data, or other computer-readable instructions to be loaded into computing system 610. For example, storage devices 632 and 633 can be configured to read and write software, data, instructions, and/or other computer-readable information. Storage devices 632 and 633 can also be a part of computing system 610 or can be a separate device accessed through other interface systems.

Many other devices or subsystems can be connected to computing system 610. Conversely, all of the components and devices illustrated in FIG. 6 need not be present to practice the embodiments described and/or illustrated herein. The devices and subsystems referenced above can also be interconnected in different ways from that shown in FIG. 6. Computing system 610 can also employ any number of software, firmware, and/or hardware configurations. For example, one or more of the example embodiments disclosed herein can be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), and electronic-storage media (e.g., solid-state drives and flash media).

The computer-readable medium containing the computer program can be loaded into computing system 610. All or a portion of the computer program stored on the computer-readable medium can then be stored in system memory 616 and/or various portions of storage devices 632 and 633. When executed by processor 614, a computer program loaded into computing system 610 can cause processor 614 to perform and/or be a means for performing the functions of one or more of the example embodiments described and/or illustrated herein. Additionally or alternatively, one or more of the example embodiments described and/or illustrated herein can be implemented in firmware and/or hardware. For example, computing system 610 can be configured as an Application Specific Integrated Circuit (ASIC) adapted to implement one or more of the example embodiments disclosed herein.

Figure 7:
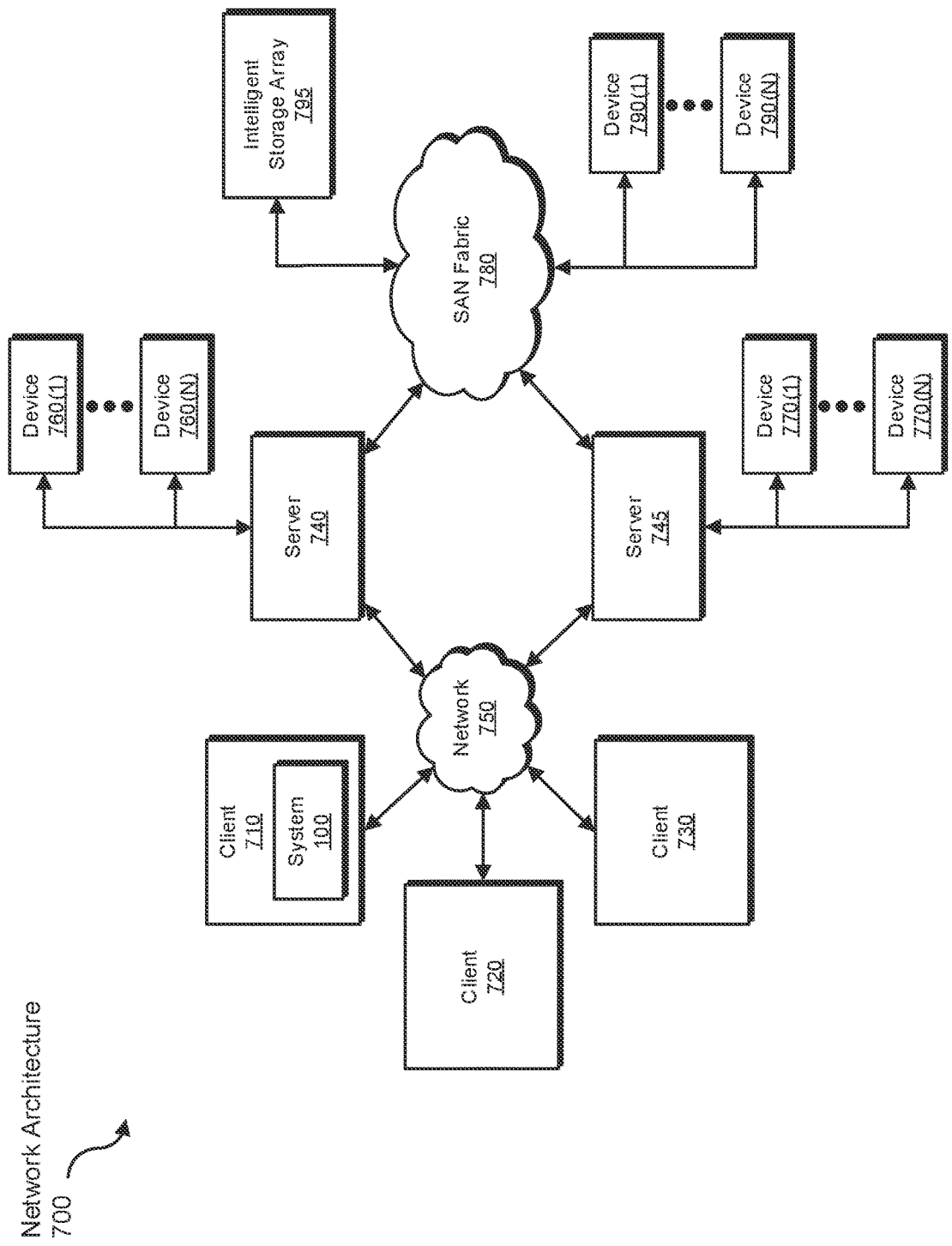
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 can be coupled to a network 750. As detailed above, all or a portion of network architecture 700 can perform and/or be a means for performing, either alone or in combination with other elements, one or more of the steps disclosed herein (such as one or more of the steps illustrated in FIG. 3). All or a portion of network architecture 700 can also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, and/or the Internet. In an example, client systems 710, 720, and/or 730 and/or servers 740 and/or 745 can include all or a portion of system 100 from FIG. 1.

As illustrated in FIG. 7, one or more storage devices 760(1)-(N) can be directly attached to server 740. Similarly, one or more storage devices 770(1)-(N) can be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) can represent Network-Attached Storage (NAS) devices configured to communicate with servers 740 and 745 using various protocols, such as Network File System (NFS), Server Message Block (SMB), and/or Common Internet File System (CIFS).

Servers 740 and 745 can also be connected to a Storage Area Network (SAN) fabric 780. SAN fabric 780 generally represents any type or form of computer network or architecture capable of facilitating communication between a plurality of storage devices. SAN fabric 780 can facilitate communication between servers 740 and 745 and a plurality of storage devices 790(1)-(N) and/or an intelligent storage array 795. SAN fabric 780 can also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data, instructions, and/or other computer-readable instructions.

In certain embodiments, and with reference to example computing system 610 of FIG. 6, a communication interface, such as communication interface 622 in FIG. 6, can be used to provide connectivity between each client system 710, 720, and 730 and network 750. Client systems 710, 720, and 730 can be able to access information on server 740 or 745 using, for example, a web browser or other client software. Such software can allow client systems 710, 720, and 730 to access data hosted by server 740, server 745, storage devices 760(1)-(N), storage devices 770(1)-(N), storage devices 790(1)-(N), and/or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein can be encoded as a computer program and loaded onto and executed by server 740, server 745, storage devices 760(1)-(N), storage devices 770(1)-(N), storage devices 790(1)-(N), intelligent storage array 795, or any combination thereof. In some examples, all or a portion of one or more of the example embodiments disclosed herein can also be encoded as a computer program, stored in server 740, run by server 745, and distributed to client systems 710, 720, and 730 over network 750.

As detailed above, computing system 610 and/or one or more components of network architecture 700 can perform and/or be a means for performing, either alone or in combination with other elements, one or more steps of an example method for detecting deceptive content in computer-mediated communications.

While this disclosure sets forth various embodiments using specific block diagrams, flowcharts, and examples, each block diagram component, flowchart step, operation, and/or component described and/or illustrated herein can be implemented, individually and/or collectively, using a wide range of hardware configurations, software configurations, and/or firmware configurations. Those of skill in the art will appreciate the example logical blocks, elements, modules, circuits, and steps described in the examples disclosed hereby can be implemented as electronic hardware, computer software, or combinations of both, as practicable. To clearly illustrate this interchangeability of hardware and software, example components, blocks, elements, modules, circuits, and steps have been described hereby generally in terms of their functionality. Whether such functionality is implemented as hardware or software depends upon the particular application and design constraints imposed on an overall system. Skilled artisans can implement the described functionality in different ways for each particular application, but such implementation decisions should not be interpreted as causing a departure from the scope of the present disclosure. In addition, any disclosure of components contained within other components should be considered as an example since many other architectures can be implemented to achieve the same functionality.

In some examples, all or a portion of example system 100 in FIG. 1 can represent portions of a cloud-computing or network-based environment. Cloud-computing environments can provide various services and applications via the Internet. These cloud-based services (e.g., software as a service, platform as a service, infrastructure as a service, etc.) can be accessible through a web browser and/or a user interface. Various functions described herein can be provided through a remote desktop environment and/or any other cloud-based computing environment.

According to various embodiments, all or a portion of example system 100 in FIG. 1 can be implemented within a virtual environment. For example, the modules and/or data described herein can reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein can reside and/or execute within a virtualization layer. As used herein, the term "virtualization layer" generally refers to any data layer and/or application layer that overlays and/or is abstracted from an operating system environment. A virtualization layer can be managed by a software virtualization solution (e.g., a file system filter) that presents the virtualization layer as though it were part of an underlying base operating system. For example, a software virtualization solution can redirect calls that are initially directed to locations within a base file system and/or registry to locations within a virtualization layer.

In some examples, all or a portion of example system 100 in FIG. 1 can represent portions of a mobile computing environment. Mobile computing environments can be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments can have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of thirdparty software to inspect the behavior of other applications, controls to restrict installation of applications (e.g., to only originate from approved application stores), etc. Various functions described herein can be provided for a mobile computing environment and/or can interact with a mobile computing environment.

In addition, all or a portion of example system 100 in FIG. 1 can represent portions of, interact with, consume data produced by, and/or produce data consumed by one or more systems for information management. As used herein, the term "information management" can refer to the protection, organization, and/or storage of data. Examples of systems for information management can include, without limitation, storage systems, backup systems, archival systems, replication systems, high availability systems, data search systems, virtualization systems, and the like.

While various embodiments have been described and/or illustrated herein in the context of fully functional computing systems, one or more of these example embodiments can be distributed as a program product in a variety of forms, regardless of the particular type of computer-readable media used to actually carry out the distribution. The embodiments disclosed herein can also be implemented using software modules that perform certain tasks. These software modules can include script, batch, or other executable files that can be stored on a computer-readable storage medium and/or by a computing system. In some embodiments, these software modules can configure a computing system to perform one or more of the example embodiments disclosed herein.

In addition, one or more of the modules described herein can transform data, physical devices, and/or representations of physical devices from one form to another. For example, one or more of the modules recited herein can receive digital text to be transformed, transform the digital text, output a result of the transformation to a display, use the result of the transformation to indicate a probability of the digital text including deceptive content, and store the result of the transformation to a physical memory device. Additionally or alternatively, one or more of the modules recited herein can transform a processor, volatile memory, non-volatile memory, and/or any other portion of a physical computing device from one form to another (e.g., from generic to non-generic) by executing on the computing device, storing data on the computing device, and/or otherwise interacting with the computing device. For example, at least a portion of a tangible digital processor of a computing device can be transformed to a limited-purpose digital processor (i.e., a non-generic processor) during a time period when the at least the portion of the digital processor executes at least a portion of one or more computer-executable instructions described hereby because during the time period of execution, executing the at least the portion of the one or more computer-executable instructions described hereby (i) configures internal gates of the digital processor to execute only the at least the portion of the one or more computer-executable instructions described hereby and (ii) those configured internal gates of the digital processor are not configured or available to execute other computer-executable instructions.

A reference using a designation such as "first," "second," and so forth does not limit either the quantity or the order of those elements. Rather, these designations are used as a convenient method of distinguishing between two or more elements or instances of an element. Thus, a reference to first and second elements does not mean only two elements can be employed, or the first element must necessarily precede the second element. Also, unless stated otherwise, a set of elements can comprise one or more elements. In addition, terminology of the form "at least one of: A, B, or C" or "one or more of A, B, or C" or "at least one of the group consisting of A, B, and C" used in the description or the claims can be interpreted as "A or B or C or any combination of these elements". For example, this terminology can include A, or B, or C, or A and B, or A and C, or A and B and C, or 2A, or 2B, or 2C, and so on.

Unless otherwise noted, the terms "connected to" and "coupled to" (and their derivatives), as used in the specification and claims, can be construed as permitting both direct and indirect (i.e., via other elements or components) connection. In addition, the terms "a" or "an," as used in the specification and claims, can be construed as meaning "at least one of." In some examples, the singular can portend the plural, where practicable. Finally, for ease of use, the terms "including" and "having" (and their derivatives), as used in the specification and claims, are interchangeable with and have the same meaning as the word "comprising."

Nothing stated or depicted in this application is intended to dedicate any component, step, block, element, feature, object, benefit, advantage, or equivalent to the public, regardless of whether the component, step, block, element, feature, object, benefit, advantage, or the equivalent is recited in the claims.

The process parameters and sequence of steps described and/or illustrated herein are given by way of example only and can be varied as is practicable. For example, while the steps illustrated and/or described herein can be shown or discussed in a particular order, some of these steps may not necessarily need to be performed in the order illustrated or discussed. The various example methods described and/or illustrated herein can also omit one or more of the steps described or illustrated herein or include additional steps in addition to those disclosed.

This description is provided to enable persons skilled in the art to best utilize various aspects of the example embodiments disclosed herein. The present disclosure is not intended to be limited to the specifically disclosed examples alone, is not intended to be exhaustive, and is not intended to be limited to any precise form disclosed. The embodiments disclosed herein should be considered in all respects illustrative and not restrictive. Many modifications and variations are possible without departing from the spirit and scope of the present disclosure. While this disclosure describes examples, changes and modifications can be made to the examples disclosed hereby without departing from the scope defined by the appended claims. A feature from any of the provided examples can be used in combination with one another feature from any of the provided examples in accordance with the general principles described hereby. Reference should be made to the appended claims and their equivalents in determining the scope of the present disclosure.

What is claimed is:

1. A computer-implemented method for detecting deceptive content in computer-mediated communications, at least a portion of the method being performed by a computing device comprising at least one processor, the method comprising:

parsing digital text to identify processable language-action cues in the digital text;

automatically analyzing, using the computing device and using a machine learning-based classifying algorithm, the processable language-action cues to produce respective probabilities of the digital text including the deceptive content, wherein the machine learning-based classifying algorithm is trained with training data including:
    training language-action cues from (i) digital data indicating response information known to be deceptive and (ii) digital data indicating response information known to be truthful; and
    respective predictor weights associated with the training language-action cues;
producing a histogram from the respective probabilities of the digital text including the deceptive content; and
displaying the histogram on a first user display device, wherein the histogram indicates, over a period of time, frequencies of the respective probabilities of the digital text including the deceptive content.

2. The computer-implemented method of claim 1, further comprising:
    creating the training data by:
        displaying, on at least one of the first user display device or a second user display device, at least one of questions, statements, or answers;
        receiving, from a human interface device, digital data describing response information, wherein the response information is known to be deceptive or truthful;
        identifying the training language-action cues in the digital data describing the response information;
        correlating, using logistic regression analysis, the training language-action cues to identify respective statistical significances of the training language-action cues;
        classifying the training language-action cues to identify respective degrees of deviant behavior of the training language-action cues; and
        assigning, based on the respective statistical significances and the respective degrees of deviant behavior, the respective predictor weights to each of the training language-action cues; and
    storing, as the training data, the training language-action cues and the respective predictor weights.

3. The computer-implemented method of claim 2, further comprising displaying, on the at least one of the first user display device or the second user display device, either:
    instructions to respond quickly and in a deceptive manner; or
    instructions to respond quickly and in a truthful manner, wherein the at least one of the questions, the statements, or the answers are configured to elicit the response information from a person.

4. The computer-implemented method of claim 2, wherein the respective statistical significances include at least one of a minimum probability of deception, a first quadrant probability of deception, a median probability of deception, a mean probability of deception, a third quadrant probability of deception, or a maximum probability of deception.

5. The computer-implemented method of claim 1, wherein the digital text is at least one of:
    transcript text;
    interview text;
    questionnaire response text;
    converted digital text produced by converting, using a natural language processing technique, digitized audio to the converted digital text;
    social media text; or
    Internet-sourced digital text.

6. The computer-implemented method of claim 1, further comprising:
    recording the digital text in a digital storage device;
    retrieving the digital text from the digital storage device; and
    automatically displaying, on the first user display device, the digital text and the histogram in a synchronized manner.

7. The computer-implemented method of claim 1, further comprising combining, to form combined deception data, the respective probabilities of the digital text including the deceptive content with at least one of:
    probabilities of deception that are output from facial expression analysis;
    probabilities of deception that are output from natural language processing;
    probabilities of deception that are output from speech tone analysis;
    probabilities of deception that are output from speech pitch analysis; or
    probabilities of deception that are output from physiological testing,
    wherein the histogram indicates frequencies of the respective probabilities of the combined deception data indicating the deceptive content.

8. A system for detecting deceptive content in computer-mediated communications, the system comprising:
    a physical processor; and
    a physical memory coupled to the physical processor and comprising computer-executable instructions that, when executed by the physical processor, cause the physical processor to:
        parse digital text to identify processable language-action cues in the digital text;
        automatically analyze, at the system and using a machine learning-based classifying algorithm, the processable language-action cues to produce respective probabilities of the digital text including the deceptive content,
        wherein the machine learning-based classifying algorithm is trained with training data including:
            training language-action cues from (i) digital data indicating response information known to be deceptive and (ii) digital data indicating response information known to be truthful; and
            respective predictor weights associated with the training language-action cues;
        produce a histogram from the respective probabilities of the digital text including the deceptive content; and
        display the histogram on a first user display device, wherein the histogram indicates, over a period of time, frequencies of the respective probabilities of the digital text including the deceptive content.

9. The system of claim 8, wherein the computer-executable instructions further comprise computer-executable instructions that, when executed by the physical processor, cause the physical processor to:
    create the training data by:
        displaying, on at least one of the first user display device or a second user display device, at least one of questions, statements, or answers;
        receiving, from a human interface device, digital data describing response information, wherein the response information is known to be deceptive or truthful;
        identifying the training language-action cues in the digital data describing the response information;

correlating, using logistic regression analysis, the training language-action cues to identify respective statistical significances of the training language-action cues;

classifying the training language-action cues to identify respective degrees of deviant behavior of the training language-action cues; and assigning, based on the respective statistical significances and the respective degrees of deviant behavior, the respective predictor weights to each of the training language-action cues; and store, as the training data, the training language-action cues and the respective predictor weights.

10. The system of claim 9, wherein the computer-executable instructions further comprise computer-executable instructions that, when executed by the physical processor, cause the physical processor to display, on the at least one of the first user display device or the second user display device, either:

instructions to respond quickly and in a deceptive manner; or instructions to respond quickly and in a truthful manner, wherein the at least one of the questions, the statements, or the answers are configured to elicit the response information from a person.

11. The system of claim 9, wherein the respective statistical significances include at least one of a minimum probability of deception, a first quadrant probability of deception, a median probability of deception, a mean probability of deception, a third quadrant probability of deception, or a maximum probability of deception.

12. The system of claim 8, wherein the digital text is at least one of:

transcript text;

interview text;

questionnaire response text;

converted digital text produced by converting, using a natural language processing technique, digitized audio to the converted digital text;

social media text; or

Internet-sourced digital text.

13. The system of claim 8, wherein the computer-executable instructions further comprise computer-executable instructions that, when executed by the physical processor, cause the physical processor to:

record the digital text in a digital storage device;

retrieve the digital text from the digital storage device; and automatically display, on the first user display device, the digital text and the histogram in a synchronized manner.

14. The system of claim 8, wherein the computer-executable instructions further comprise computer-executable instructions that, when executed by the physical processor, cause the physical processor to form combined deception data by combining the respective probabilities of the digital text including the deceptive content with at least one of:

probabilities of deception that are output from facial expression analysis;

probabilities of deception that are output from natural language processing;

probabilities of deception that are output from speech tone analysis; or probabilities of deception that are output from speech pitch analysis, wherein the histogram indicates frequencies of the respective probabilities of the combined deception data indicating the deceptive content.

15. A non-transitory computer-readable medium comprising one or more computer-executable instructions that, when executed by at least one processor of a computing device, cause the computing device to:

parse digital text to identify processable language-action cues in the digital text;

automatically analyze, at the computing device and using a machine learning-based classifying algorithm, the processable language-action cues to produce respective probabilities of the digital text including deceptive content, wherein the machine learning-based classifying algorithm is trained with training data including:

training language-action cues from (i) digital data indicating response information known to be deceptive and (ii) digital data indicating response information known to be truthful; and respective predictor weights associated with the training language-action cues;

produce a histogram from the respective probabilities of the digital text including the deceptive content; and display the histogram on a first user display device, wherein the histogram indicates, over a period of time, frequencies of the respective probabilities of the digital text including the deceptive content.

16. The non-transitory computer-readable medium of claim 15, further comprising computer-executable instructions that, when executed by the at least one processor, cause the computing device to:

create the training data by:

displaying, on at least one of the first user display device or a second user display device, at least one of questions, statements, or answers;

receiving, from a human interface device, digital data describing response information, wherein the response information is known to be deceptive or truthful;

identifying the training language-action cues in the digital data describing the response information;

correlating, using logistic regression analysis, the training language-action cues to identify respective statistical significances of the training language-action cues;

classifying the training language-action cues to identify respective degrees of deviant behavior of the training language-action cues; and assigning, based on the respective statistical significances and the respective degrees of deviant behavior, the respective predictor weights to each of the training language-action cues; and store, as the training data, the training language-action cues and the respective predictor weights.

17. The non-transitory computer-readable medium of claim 16, further comprising computer-executable instructions that, when executed by the at least one processor, cause the computing device to display, on the at least one of the first user display device or the second user display device, either:

instructions to respond quickly and in a deceptive manner; or instructions to respond quickly and in a truthful manner, wherein the at least one of the questions, the statements, or the answers are configured to elicit the response information from a person.

18. The non-transitory computer-readable medium of claim 16, wherein the respective statistical significances include at least one of a minimum probability of deception, a first quadrant probability of deception, a median probability of deception, a mean probability of deception, a third quadrant probability of deception, or a maximum probability of deception.

19. The non-transitory computer-readable medium of claim 15, wherein the digital text is at least one of:
- transcript text;
- interview text;
- questionnaire response text;
- converted digital text produced by converting, using a natural language processing technique, digitized audio to the converted digital text;
- social media text; or
- Internet-sourced digital text.

20. The non-transitory computer-readable medium of claim 15, further comprising computer-executable instructions that, when executed by the at least one processor, cause the computing device to:
- record the digital text in a digital storage device;
- retrieve the digital text from the digital storage device; and
- automatically display, on the first user display device, the digital text and the histogram in a synchronized manner.

21. The non-transitory computer-readable medium of claim 15, further comprising computer-executable instructions that, when executed by the at least one processor, cause the computing device to form combined deception data by combining the respective probabilities of the digital text including the deceptive content with at least one of:
- probabilities of deception that are output from facial expression analysis;
- probabilities of deception that are output from natural language processing;
- probabilities of deception that are output from speech tone analysis;
- probabilities of deception that are output from speech pitch analysis; or
- probabilities of deception that are output from physiological testing,
- wherein the histogram indicates frequencies of the respective probabilities of the combined deception data indicating the deceptive content.

* * * * *